June 30, 1953   T. E. BELSHAW   2,643,621
DOUGH FORMER
Filed Jan. 18, 1947   3 Sheets-Sheet 1
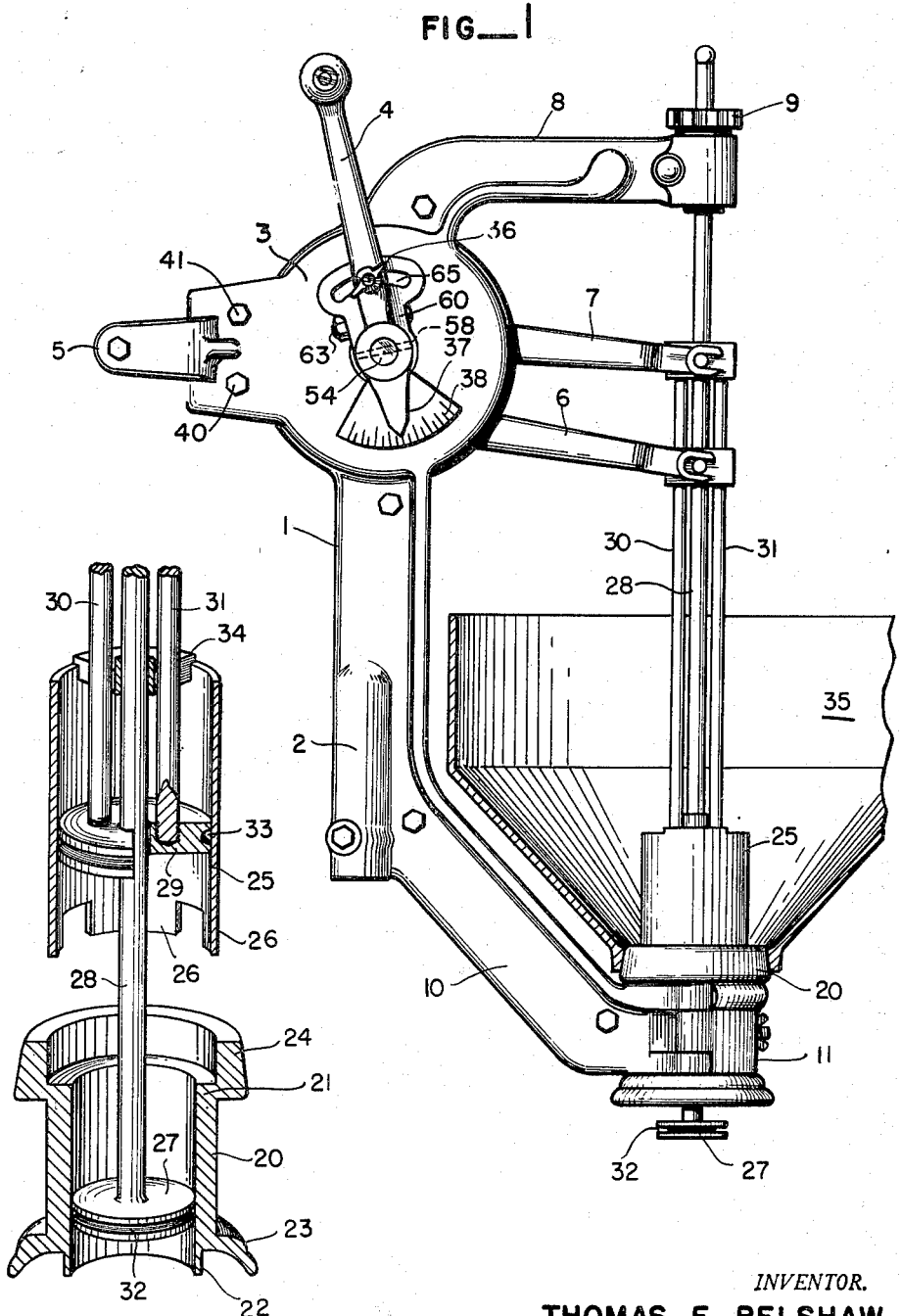
INVENTOR.
THOMAS E. BELSHAW
BY Paul Blwen
ATTORNEY June 30, 1953 — T. E. BELSHAW — 2,643,621
DOUGH FORMER
Filed Jan. 18, 1947 — 3 Sheets-Sheet 2
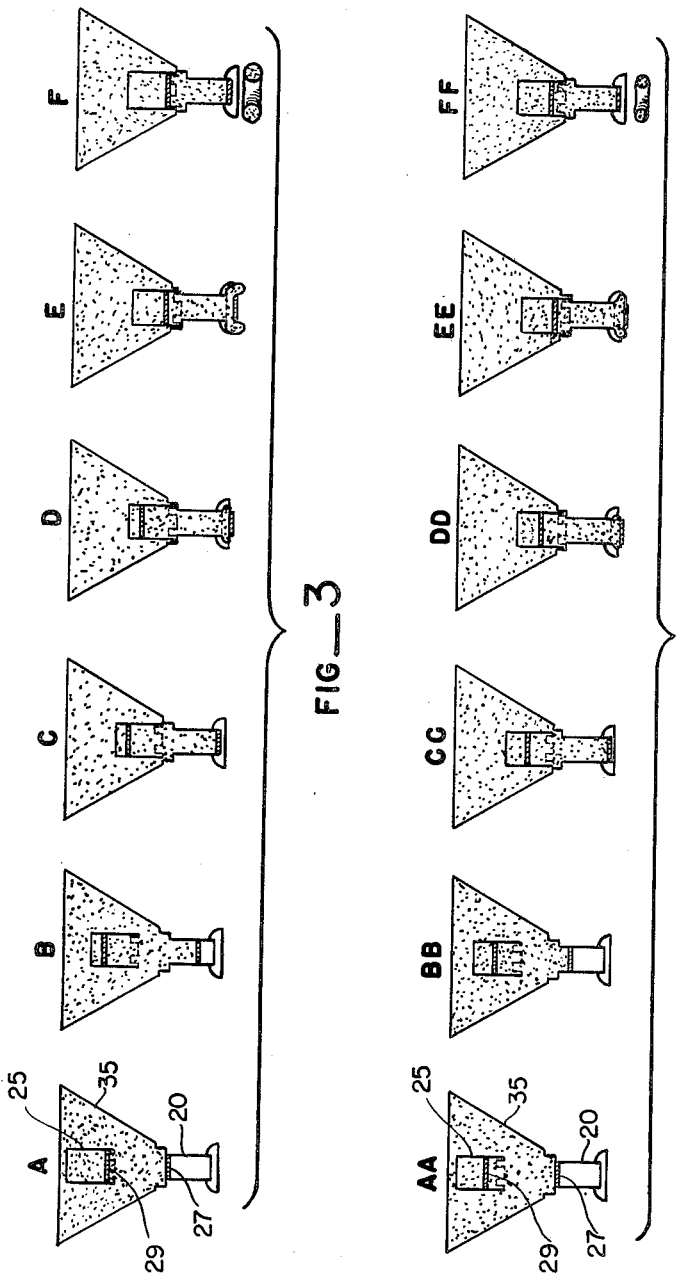
FIG—3  FIG—4
INVENTOR.
THOMAS E. BELSHAW
BY Paul Blwin
ATTORNEY June 30, 1953  T. E. BELSHAW  2,643,621
DOUGH FORMER
Filed Jan. 18, 1947  3 Sheets-Sheet 3

INVENTOR.
Thomas E. Belshaw
BY
Paul Bliven

Patented June 30, 1953

2,643,621

UNITED STATES PATENT OFFICE 2,643,621

DOUGH FORMER

Thomas E. Belshaw, Seattle, Wash.

Application January 18, 1947, Serial No. 722,904

8 Claims. (Cl. 107—14)

The present invention relates to a dough former, in particular to a machine for forming a pastry called a "Raised Doughnut."

At the present time raised doughnuts are formed by the manual manipulation of a hand cutter. The machine cutting of raised doughnuts has not been possible before because of the stiff nature of the dough required for this type of doughnut. The manipulation of such heavy doughs has not been possible even in such machines as that shown in the Walter Belshaw Patent 1,738,033, December 3, 1929. The present machine, also, finds wide use as a pie-filler dispenser or a meter for a large range of plastic, semiplastic, or doughy materials or aggregates.

Having in mind the lack of a machine for forming raised doughnuts, it is an object of the present invention to devise such a machine.

Ancillary to such object is the use of a metering sleeve that has a greater diameter than the forming cylinder and of means for transferring dough from the metering sleeve to the forming cylinder.

Applicant has found that the stiff dough used for making raised doughnuts can be machine handled to make the usual size doughnut by employing a metering sleeve and by giving this sleeve a larger diameter than the forming cylinder, by capturing dough in such sleeve and then dispensing the dough through the cylinder. This is broadly the construction and operation of the device of the present invention which is described in more detail hereinafter and in connection with the accompanying drawings, in which:

Figure 1 is an elevational view of a machine embodying the present invention, part of the hopper being broken away;

Fig. 2 is a sectional elevational enlarged view of parts adjacent the dispensing port of the machine;

Figure 3 consists of a series of diagrams showing the operation of the machine for the dispensing of a large doughnut;

Figure 4 consists of a series of diagrams showing the operation of the machine for the dispensing of a small doughnut.

Figure 5:
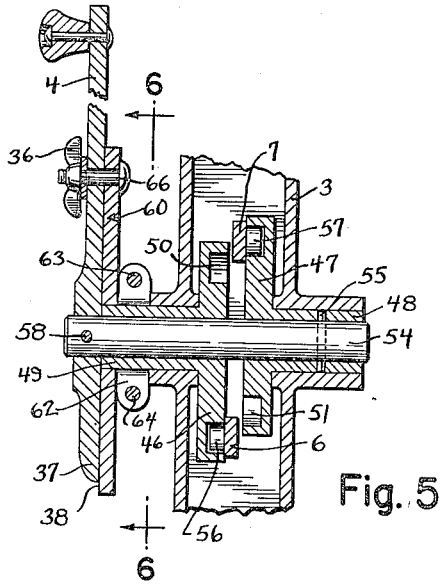

Fig. 5 is a vertical sectional view of the cam assembly and driving mechanism.

Figure 6:
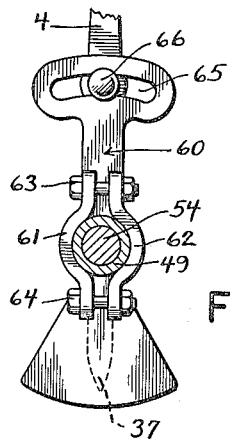

Fig. 6 is a vertical sectional view taken along the line 6—6 of Fig. 5.

Figure 7:
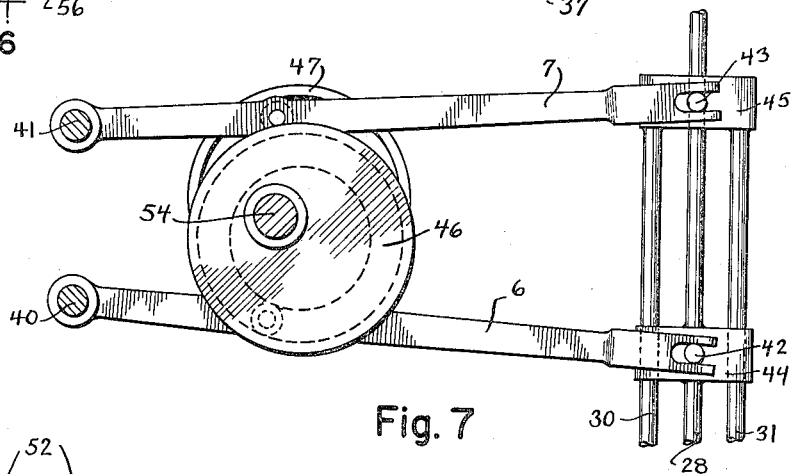
Figure 8:
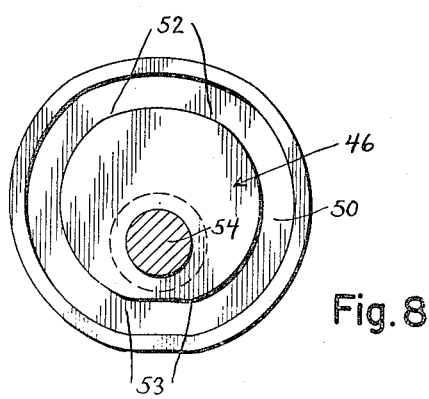

Fig. 7 is a side elevational view showing one of the cams adjusted in a position beyond the other and including the cam levers connected with the piston rods, the cam housing not being shown; and Fig. 8 is a front elevational view of one of the cams.

In the assembly view of Figure 1, there is shown a dough forming machine embodying my present invention, in which there is a frame 1, having a socket 2, for the reception of a support pin attached to the conventional extensible arm, which pin and arm allow movement of the machine around and over the screens or pans on which the doughnuts are dropped to allow them to raise before cooking. Formed in the upper part of the frame is a cam housing 3, and a handle 5 is provided on the housing to give a hand hold for easy swinging of the machine over the proofing screens. Above and mounted on the cam housing is an arm 8 that has at its outer end a crown bearing 9. Below and mounted on the cam housing is another arm 10 that has at its outer end a socket 11 which holds a forming cylinder 20.

The cam housing, supporting socket, and arms which form the frame 1 are in the shape of a U which is on its side. The forming cylinder 20, Fig. 2, has an inlet end 21 and a discharge end 22. Around the discharge end is a guard 23. Contiguous with the inlet end is an enlarged recess formed by a guide collar 24. This collar has a greater inside diameter than that of the forming cylinder and is provided as a guide and cutoff seat for the metering sleeve 25. This sleeve 25 is cylindrical and arranged on the same axis as the forming cylinder. The outside surface of the guide collar 24 in tapered and seated thereon is a dough hopper 35. The lower edge of the meter sleeve is provided with a plurality of guide fingers 26. These fingers are of a length to allow a part of the sleeve 25 to enter the guide collar 24 and thus to close off, or cut off, the metering sleeve and forming cylinder from the dough hopper preparatory to discharging the dough. Fitted in and operating in the forming cylinder 20 is a forming piston 27 which is actuated by the forming piston rod 28. Fitted in and operating in the meter sleeve 25 is a meter piston 29 which is actuated by two piston rods 30, 31. The two meter piston rods 30, 31 act as one rod. In each of the pistons is a deep and wide sealing groove 32, 33. The meter sleeve is secured to and moves with the piston rod 28 belonging to the forming piston 27. This securing is accomplished by the plug 34 placed in the upper end of the meter sleeve 25. Only a sector of this plug is shown in Figure 2, the other portions being cut away. The rod 28 for the forming piston 27 is actuated by a cam lever 6, and the rods 30, 31 for the meter piston 29 are actuated by a cam lever 7. The upper end of the forming piston rod 28 is guided and journaled by the crown bearing 9.

The cam levers 6, 7 are pivotally mounted at one end within the casing as at 40, 41 and extend out of a slot in the side of the casing. The other ends of the levers are forked and these forked ends straddle transverse pins 42, 43 provided by blocks 44, 45. As indicated by dotted lines in Fig. 7, the block 44 has a bore-like opening at each end slidably receiving the piston rods 30 and 31 and the upper ends of these rods are secured to the block 45. The central piston rod 28 is fixedly secured to the block 44 by the pin 42 and is slidably received through the block 45.

Mounted in the housing 3 are a pair of cams 46 and 47 provided with eccentrically disposed hubs or sleeves 48, 49 on one side and cam grooves 50, 51 on the other side. Each of these grooves in its general form is circular, certain arcs of which, concentric with the axis on which the cams are designed to rotate, being formed into rests, shown in Fig. 8 and designated as 52 and 53. The cam 47 is journaled in the housing and secured to and rotatable with a shaft 54 which extends through the cam sleeve 48, a pin 55 establishing the connection therebetween. The cam 46 is likewise journal-mounted in the housing by its sleeve 49 and the latter is freely journaled on the shaft 54. Riding in the cam grooves 50, 51 are followers 56, 57 presented by the cam levers.

To afford convenient means for the adjusting of one cam relative to the other, I provide, in connection with a crank 4 fixedly secured as by a pin 58 to the shaft 54, a pointer 37. Beneath the crank and pointer a scale member 60 is mounted which provides a scale 38 for the pointer. This member has a central opening to receive the free end of the sleeve 49, and for clamping the member to this sleeve, a pair of half-collar clamps 61, 62 are provided one of which is integral with the scale member. The clamps grip the sleeve 49 and are compressively secured thereto by bolts 63, 64.

The end portion of the scale member opposite from the scale is formed with an arcuate slot 65 which receives an adjusting screw 66 passing through the crank 4 and provided with a wing nut 36. Accordingly, the angular position of the two cams 46 and 47 with respect to each other is readily adjustable by loosening the wing nut and moving the pointer 37 with respect to the scale 38.

The cams operate so that as the forming piston 27 leaves the discharge end 22 of the forming cylinder 20, the guide fingers 26 of the meter sleeve 25 enter the guide collar 24. In this position, the guide fingers 26 of metering sleeve 25 through the metering piston 29, and the forming piston rod 28 then act as a bearing and guide for the forming piston 27 and the lower end of the forming piston rod 28.

Figure 3 shows a series of diagrams depicting the operation of the present device when adjusted to make a large doughnut. Figure 4 is for small doughnuts. The reference numerals in these figures refer to corresponding parts found in Figures 1 and 2. The operation of the device in Figure 3 may be compared to the operation in Figure 4 by considering that the movement of the forming piston 27 and the meter sleeve 25 is the same in both figures, they being joined together, and that the variation between the action as shown by the two figures is had by changing the relative movement of the meter piston 29 with respect to the meter sleeve and the forming piston.

Referring first to Figure 3, the start of the cycle is shown at A, where the meter sleeve and the forming piston are at the top of their stroke, the piston being flush with the top of the forming cylinder 20. The cycle continues in B, as the forming piston moves downward, it tends to draw dough into the forming cylinder. Also, the meter sleeve moves down and dough is drawn into the sleeve by the suction of the meter piston which remains almost stationary but moves upwardly a small amount relative to the downward movement of the sleeve. The downward movement of the meter sleeve, also, forces dough into the sleeve. This loading of the forming cylinder and the meter sleeve continues until the position shown in C is reached. At this point in the cycle the guide fingers 26 enter the guide collar 24 and the forming piston 27 leaves the forming cylinder. Between B and C the meter piston 29 has traveled downwardly with the sleeve and forming piston. From C to D the guide fingers fully enter the guide collar and the meter sleeve cuts off the dough. During this operation the two pistons move downwardly at the same rate, and as they are of different diameters some dough will be expelled back into the hopper from the under edge of the meter sleeve through the slots between the guide fingers 26 thereof. Also, dough will begin to be forced out of the discharge opening formed by the discharge end 22 of the forming cylinder and the forming piston. Further discharge of dough is had by a downward movement of the meter piston while the forming piston is at rest. This is shown by the movement from D to E. The cutoff of the doughnut is shown at F, and between F and A the cycle is completed.

The series of diagrams shown in Figure 4 depict the operation for a smaller doughnut than made by the sequences of Figure 3. The adjustment in the machine is made by loosening the wing nut 36 on the crank 4 and moving the pointer on the scale 38, and then again tightening the wing nut. This movement to make a smaller doughnut advances the cycle of meter piston relative to the forming piston so that their movement relative to each other is not as great as for the larger doughnut. Each piston performs the same cycle whether the doughnut formed is large or small but the movement of one piston in relation to the other is changed by the adjustment. This advancement of the meter piston by the adjustment for a small doughnut takes the piston off its almost maximum high as shown in A and advances it so that it is well along on its down stroke as shown in AA. Consequently as the sequences shown in BB, CC, DD, and EE follow, less dough is drawn into the meter sleeve and less dough is expelled through the discharge port. Further, between EE and FF the meter piston will move upward relative to the meter sleeve and pull back some of the dough that has been forced through the discharge port. Also, between FF and AA the meter piston will reach its maximum rise and again start its descent.

The cams in the cam housing 3 are practically constant velocity cams, the acceleration occurring in a little less than three degrees. This construction allows the two pistons to travel together for a part of the cycle as they move downward and allows of the movement relative to each other for adjusting the size of the doughnut without the creation of interference and packing of dough in the forming cylinder.

Having thus described my invention, I claim:

1. A dough dispensing machine having: a forming cylinder and a metering sleeve co-acting therewith, said cylinder and sleeve being relatively movable axially, a forming piston movably mounted in said forming cylinder and rigidly secured to said metering sleeve, and finger and guide means therefor to hold such cylinder and sleeve in alignment as relative movement therebetween brings them into adjacency.

2. A dough dispensing machine having: a forming cylinder, a metering sleeve co-acting with said cylinder, said cylinder and sleeve being relatively movable axially, a forming piston movably secured in said forming cylinder and rigidly secured to said metering sleeve, and guide means to hold said cylinder and sleeve in alignment as relative movement therebetween brings them into adjacency.

3. A dough dispensing machine having: a forming cylinder, a forming piston guided therein, said cylinder having an inlet and a discharge end, said forming piston having movement in said cylinder and out of said discharge end, a dough hopper connected to said inlet end, a metering sleeve in said hopper and coaxial of the cylinder, said sleeve being rigidly secured to the forming piston and arranged for reciprocal axial movement from and to said cylinder to cut off the inlet end thereof from the hopper as the forming piston moves out of said discharge end, guide means to hold said cylinder and sleeve in alignment when the sleeve is brought into adjacency with the cylinder, and means for imparting said reciprocal movement to the sleeve.

4. A dough dispensing machine having: a forming cylinder and a forming piston guided therein, said cylinder having its ends open and serving as inlet and discharge ends, said forming piston having reciprocal movement in said cylinder and out of said discharge end to form a discharge port, a dough hopper communicating with said inlet end of the forming cylinder, a metering sleeve located in said hopper and coaxial of said cylinder, said sleeve having reciprocal axial movement in said hopper into and out of close adjacency with the inlet end of the cylinder to cut off a predetermined amount of dough from the hopper, a metering piston having reciprocal movement in and relative to the metering sleeve, a piston rod rigidly secured to the metering sleeve and the forming piston, and means to effect such movements.

5. A dough dispensing machine such as set forth in claim 4, having fingers and guide means therefor to hold said cylinder and sleeve in alignment as relative movement therebetween brings them into adjacency and said forming piston leaves said cylinder.

6. A dough dispensing machine having: a forming cylinder open at both ends, a metering sleeve co-acting with said cylinder and axially aligned therewith, said cylinder and sleeve being relatively movable axially into and out of close adjacency with one another, a forming piston slidably mounted in said forming cylinder and movable out of the open end of the cylinder furthest removed from the metering sleeve, and a piston rod rigidly secured to the forming piston and the metering sleeve and having a length causing the forming piston to move out of the forming cylinder when the cylinder and sleeve are in close adjacency.

7. A dough dispensing machine having: a forming cylinder, a metering sleeve co-acting with said cylinder and axially aligned therewith, said cylinder and sleeve being relatively movable axially into and out of close adjacency with one another, said sleeve having its end furthest removed from the forming cylinder closed, a forming piston slidably mounted in the forming cylinder, a piston rod rigidly secured to the forming piston and the closed end of the metering sleeve, a metering piston slidably mounted in said metering sleeve and slidable on said piston rod, and piston rod means connected to the metering piston and slidably extending through the closed end of the metering sleeve.

8. The dough dispensing machine of claim 7 in which means are provided for giving endwise movement to the piston rod and the piston rod means relative to the forming cylinder and relative to one another.

THOMAS E. BELSHAW.

References Cited in the file of this patent

UNITED STATES PATENTS

| Number | Name | Date |
|---|---|---|
| 1,703,434 | Smith | Feb. 26, 1929 |
| 1,738,033 | Belshaw | Dec. 3, 1929 |
| 1,856,511 | Schoel | May 3, 1932 |
| 1,866,061 | Schoel | July 5, 1932 |
| 1,968,808 | Carpenter | Aug. 7, 1934 |
| 2,256,617 | Kipnis | Sept. 23, 1941 |
| 2,383,536 | Elliott | Aug. 28, 1945 |